United States Patent [19]

Scott

[11] Patent Number: 6,049,760
[45] Date of Patent: Apr. 11, 2000

[54] METHOD OF AND APPARATUS FOR CONTROLLING THE QUALITY OF PROCESSED SEISMIC DATA

[75] Inventor: Ian Richard Scott, Guildford, United Kingdom

[73] Assignee: Geco-Prakla (UK) Limited, Gatwick, United Kingdom

[21] Appl. No.: 09/029,120

[22] PCT Filed: Aug. 12, 1996

[86] PCT No.: PCT/GB96/01964

§ 371 Date: Feb. 24, 1998

§ 102(e) Date: Feb. 24, 1998

[87] PCT Pub. No.: WO97/08570

PCT Pub. Date: Mar. 6, 1997

[30] Foreign Application Priority Data

Aug. 25, 1995 [GB]  United Kingdom ............... 9517505

[51] Int. Cl.[7] .................................................. G06F 19/00
[52] U.S. Cl. ............................................................ 702/14
[58] Field of Search ................................. 702/14, 17, 18, 702/16; 367/73, 77

[56] References Cited

U.S. PATENT DOCUMENTS

| | | | |
|---|---|---|---|
| 3,696,331 | 10/1972 | Guinzy et al. ........................ | 340/15.5 |
| 4,679,174 | 7/1987 | Gelfand ................................. | 367/73 |
| 4,759,636 | 7/1988 | Ahern et al. ......................... | 702/17 |
| 5,450,370 | 9/1995 | Beasley et al. ...................... | 367/73 |
| 5,504,678 | 4/1996 | Juszczak et al. .................... | 702/14 |
| 5,550,787 | 8/1996 | Rialan et al. ........................ | 367/77 |
| 5,873,050 | 2/1999 | Schneider, Jr. et al. ............. | 702/14 |

OTHER PUBLICATIONS

Signal Processing: Theories and Applications, Sep. 5–8, 1998, vol. 2, Lacome et al, "Combined Use of Homomorphic Filtering...".

Geophysics, vol. 50, No. 12, Dec. 1985, Ronen et al, "Surface–consistent residual statistics estimation...", pp. 2759–2767.

Oil and Gas Journal, vol. 76, No. 38, Sep. 1978, Jain et al, "Seismic inversion with optimal wavelets", pp. 242–254.

*Primary Examiner*—Donald E. McElheny, Jr.
*Attorney, Agent, or Firm*—Jacobson, Price, Holman & Stern, PLLC

[57] ABSTRACT

A technique is provided for controlling the quality of processed seismic data without requiring subjective intervention. Seismic data, for instance acquired by land or marine techniques, are supplied as input (1) and a portion for testing is selected (2). First and second combinations of seismic data processing steps are selected (3 and 6). The selected data portion is processed (4 and 7) using these combinations and the thus-processed portions are analyzed to calculate the attributes thereof (5 and 8). These measures are compared (9) and the combination of processing steps giving the better attributes is then used to process the input seismic data (10 or 11).

9 Claims, 2 Drawing Sheets

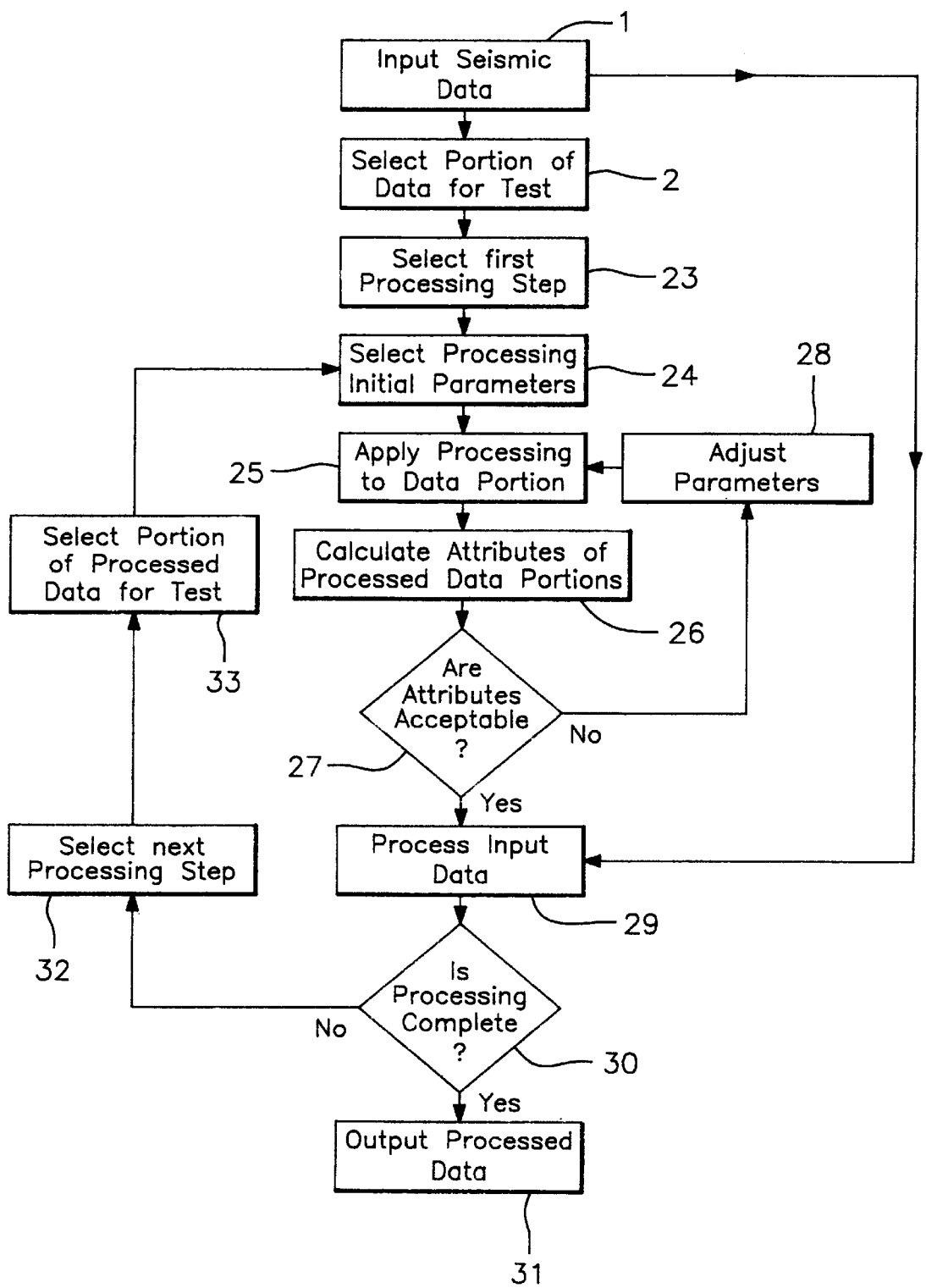

METHOD OF AND APPARATUS FOR CONTROLLING THE QUALITY OF PROCESSED SEISMIC DATA

BACKGROUND OF THE INVENTION

1. Field of the Invention

The present invention relates to a method of and an apparatus for controlling the quality of processed seismic data.

2. Description of the Related Art

Seismic data processing generally involves taking the raw acquired seismic data through a series of processing steps to produce a finally processed seismic image. The finally processed seismic image is then geologically interpreted in order to make decisions on the hydrocarbon prospectivity within the seismic survey area; the closer the finally processed seismic image is to the perceived geology, the better the quality of the processed seismic data.

The seismic processing steps and parameter selection for these steps are, therefore, very dependent on geology and target. In order to calibrate the final image in absolute terms, a priori knowledge of the geology would be required. However, such knowledge is not always available.

Current practice today is as follows: at each processing step, those parameters which can be varied are tested on a portion of seismic data. This involves producing a series of consecutive seismic image panels for each value of the "tested" parameter which are displayed either in hardcopy or on a workstation graphics display. The "best" panel is then chosen from a visual inspection and the parameters associated with that panel are selected as "optimum" for that processing step for the rest of the data. The selection of the "best" panel may be aided by the production of other supplemental information which is used to provide an indication of the "quality" of the data. For example, in the case of deconvolution (see later), autocorrelation plots and the impulse response may be used in order to select the "best" panel. However, this technique is very subjective and time consuming and does not enable the geophysicist to fully understand the "quality" of the processed seismic data. This often causes an unknown degradation in the final processing quality because of incorrect choice of parameters.

An example of a seismic processing route could include the following known steps:

1. Designature—The shape of the input energy source signature is converted to one with a known property which improves the performance of successive processing steps.

2. Gather—The seismic data are reordered so that energies reflecting at the same point of the subsurface are grouped together. These are commonly called CMP's (Common Mid Points).

3. Velocity Analysis—The data within the CMP's will contain information from varying source-to-receiver offsets (distance between source and receiver). The time at which a given subsurface interface is recorded is a function of both the source-to-receiver offset and the velocity through the subsurface. The time delay of the interface with offset is exploited to determine a velocity profile within the subsurface.

4. Deconvolution—Primary energy is that energy which travels from the source, reflects from a sub-surface interface and returns directly to the receiver, i.e. it represents the desired earth response. Unfortunately spurious events called multiples occur where energy reflects more than once between interfaces.

These spurious or multiple reflections are reduced through deconvolution. The deconvolution process can also compress the time series wavelet which represents any given interface and as such is an aid to increasing the resolution of closely separated interfaces.

5. Stack—The velocity profile derived from step 3 is used to correct all the recorded offset data to simulate source/receiver coincident data. These corrected traces are then added together to enhance the "primary" signal at the expense of ill-corrected or non-primary energy such as noise or multiples.

6. Migration—An assumption made within the gather and stack processing steps is that all the subsurface horizons are horizontally bedded. The migration process moves any non-horizontal layers to their correct spatial positioning as well as focusing the seismic image.

7. Filtering—Any unwanted frequencies not considered as primary reflection energy are removed.

Each one of these steps has a set of input parameters which affects the quality of the output data after processing at that step. For example, the parameters of the deconvolution test are selected to meet two criteria: to reduce the multiples content within the data; and to increase the resolution of the seismic image in order to distinguish separate interfaces. As the deconvolution process is statistically driven by the seismic data, the choice of the deconvolution operator parameters will control both the compression of the seismic wavelet and the periodicity of the multiples that will be attenuated. Typically, three parameter selection tests are carried out:

(i). Deconvolution window design—to decide which portion of the seismic data will be used statistically to drive the deconvolution process;

(ii). Deconvolution active operator length—to decide which multiple periods are best reduced, (iii). Deconvolution gap—to decide the amount of wavelet compression or resolution at the interfaces.

As mentioned hereinbefore, parameter selection has previously relied upon the skill and experience of an operator and has therefore, to a large extent, been subjective. The actual effects of such selection have not been known and inappropriate selection of parameters could only be judged subjectively by "dissatisfaction" with the processed seismic image. Reprocessing the seismic data with different parameters is very costly and, in any case, would involve further subjective assessment of unpredictable consequence.

SUMMARY OF THE INVENTION

According to a first aspect of the invention, there is provided a method of controlling the quality of processed seismic data, comprising the steps of:

(a) selecting a portion of the seismic data for test processing;

(b) processing said portion to form a processed data portion;

(c) analysing the processed data portion to form a measure of the quality of the processed data portion;

(d) controlling a parameter of the processing in response to the quality measure; and (e) processing the seismic data utilising the parameter which has been controlled in step (d).

The parameter being controlled in step (d) may comprise the combination of the processing steps. Thus, steps (b) and (c) may be performed for a plurality of different combinations of processing steps, and step (d) may comprise selecting the combination of processing steps having the higher or highest quality measure.

Alternatively, the parameter being controlled in step (d) may be a set of parameters.

The steps (b) and (c) may be repeated for different values of the parameter (or set of parameters), and step (d) may comprise selecting the value of the parameter (or set of parameters) corresponding to the higher or highest quality measure. Alternatively, steps (b) and (c) may be repeated for different values of the parameter (or set of parameters) until the quality measure exceeds a predetermined value, and step (d) may comprise selecting the last value of the parameter (or set of parameters).

The quality measure may be a function of a plurality of attributes of the processed data sample.

According to a second aspect of the present invention, there is provided a method of controlling a plurality of seismic data processing steps, comprising performing a method according to said first aspect of the present invention for the first seismic data processing steps and for the or each subsequent seismic data processing step, in which the seismic data for the or each subsequent seismic data processing step comprises the processed seismic data from the preceding seismic data processing step.

According to a third aspect of the present invention, there is provided an apparatus for controlling processing of seismic data, comprising means for selecting a portion of seismic data for test processing, means for processing the portion to form a processed data portion, means for analysing the processed data portion to form a measure of the quality of the processed data portion, means for controlling a parameter of the processing in response to the quality measure, and means for processing the seismic data utilising the parameter which has been controlled by the controlling means.

Selection of the portion of the seismic data for attribute testing and/or parameter optimisation may be based on geological interest or changes in the data due to geological variations, eg changes in water depth, target depth, crossing geological boundaries or passing over the crest of a reservoir.

It will be recognised that the method according to the invention is advantageous in that the quality of seismic data can be measured after using any type of parameter test using information resulting from any additional plots which may arise during the parameter testing. All aspects relating to the quality of the data can thus be quantified rather than limiting to certain characteristics which may be contained in such additional plots.

The quality of processed seismic data can be described in terms of how close the seismic image is to matching the underlying geology. This can be further described by the following "seismic" attributes:

Position—Whether the geological horizons are in the correct location within the seismic section compared to their true location.

Resolution—The ability to resolve two separate geological events both spatially and in time or depth.

Noise—Any events in the seismic data which may be random or coherent in nature and which will mask the underlying geological image.

A preferred method can be summarised by the followings steps:

Selection—Select the portion of seismic data to be subjected to quantification.

Analysis—Use per se known processing techniques to split the seismic data into components which can be used to quantify the data in terms of Position, Resolution and Noise content. The techniques used are data dependent.

Quantification—Use, for instance, per se known algorithms to quantify the components of the seismic data in terms of Position, Resolution and Noise Content. The actual quantified values used are also data dependent.

In more detail, such a method involves the following steps:

1. Select the portion of seismic data which requires quantification of its quality;

2. Separate out from this portion of seismic data, for instance, using per se known techniques, what is called the primary energy signal from what can be considered noise signals. Primary energy signals are those seismic reflections which have been recorded after a single reflection off geological interfaces. Noise signals can be considered as all other recorded reflected signals. Noise signals include interference, linear and random noise signals and multiple reflection energy signals;

Random signal-to-noise can be separated by using a technique called FX deconvolution. FX deconvolution works by predicting frequency values spatially across a seismic section. The difference between the predicted and actual values is considered to be noise. Inherent within the prediction is that the spatial frequency values only change slowly. In detail, the input seismic traces are converted to the complex frequency domain. Then, for each frequency within a given sliding spatial window, a next sample complex wiener prediction is calculated and applied to the given window. The first sample of the resulting operation is then considered as the predictable part of the trace and is outputted as the final data set. This operation continues for each frequency and each trace. The resulting values are inverted back to the time domain.

Estimated amplitude spectra calculated from the data and noise seismic data sets can be estimated using sound overlapping autocorrelations. While assuming a white underlying reflectivity series, this estimate will then represent an estimate of the underlying wavelet within the seismic data.

An autocorrelation is a time series with the properties of having the square of the underlying amplitude spectrum and zero phase. Summing many smaller autocorrelation windows within a larger window and summing autocorrelations calculated from several traces within the same geological area will improve the statistics of the estimated underlying wavelet.

One example of an attribute calculated from the estimated signal and noise seismic data is the signal-to-noise ratio. Signal-to-noise ratio is defined as the sum of the square of the data time series values divided by the sum of the square of the noise time series values.

Within an assumed white reflectivity series, multiple reflections can be predicted by calculating a weiner prediction filter. The prediction filter is generated from an autocorrelation of a given time series, the desired output being set as a time advanced version of the autocorrelation.

Parameters which affect the performance of the deconvolution include:

(a) the autocorrelation design in order to include the periods to be attenuated;

(b) the operator length in order to decide which time periods are to be attenuated; and (c) the time advancer, which will control how much of the inherent wavelet found at each event will be truncated.

The stability of the deconvolution process is controlled through both pre-whitening and averaging of autocorrelations across traces.

3. Further process the separated primary energy signal and the noise signals, for instance, using per se known techniques, to condition the data prior to quantification. This involves:

Calculation of the wavelet shapes of the primary energy and noise signals.

Calculation of the frequency contents of the primary energy and noise signals.

Calculation of the distribution with dip of the primary energy and noise signals.

4. Quantify the separated and conditioned data sets in terms of Position, Resolution and Noise. In detail, this quantifies the following seismic attributes:

Primary energy signal wavelet attributes

Temporal and spatial frequency content and bandwidth

Temporal and spatial resolution

Energy distribution with dip

Signal-to-noise ratios

Noise types and amounts

Multiples Content

Surface seismic geological interface match to borehole data (when available)

5. Use borehole data, when available, indicating known position and depths for the geologic interfaces to check that the primary energy events are at the correct location within the seismic data. This process is called "calibration".

These quantified attributes represent a measure of the quality of the seismic data. This method, when applied to two versions of the same seismic data but having differing processing routes, can be used to select which processing best matches the underlying geology and hence represents the better quality section.

The methods of controlling the processing of seismic data described hereinafter are intended for use with surface seismic data or marine seismic data, but similar methods may be used for other forms of data. Such methods can be adapted for use with any suitable seismic processing techniques. Although it is theoretically possible for these techniques to be performed by dedicated hardware, in general, the methods will be performed by programmed data processors.

BRIEF DESCRIPTION OF THE DRAWINGS

The invention will be further described, by way of example, with reference to the accompanying drawings, in which;

FIG. 2 is a schematic diagram illustrating a method constituting a second embodiment of the invention.

DETAILED DESCRIPTION OF THE PREFERRED EMBODIMENTS

Figure 1:
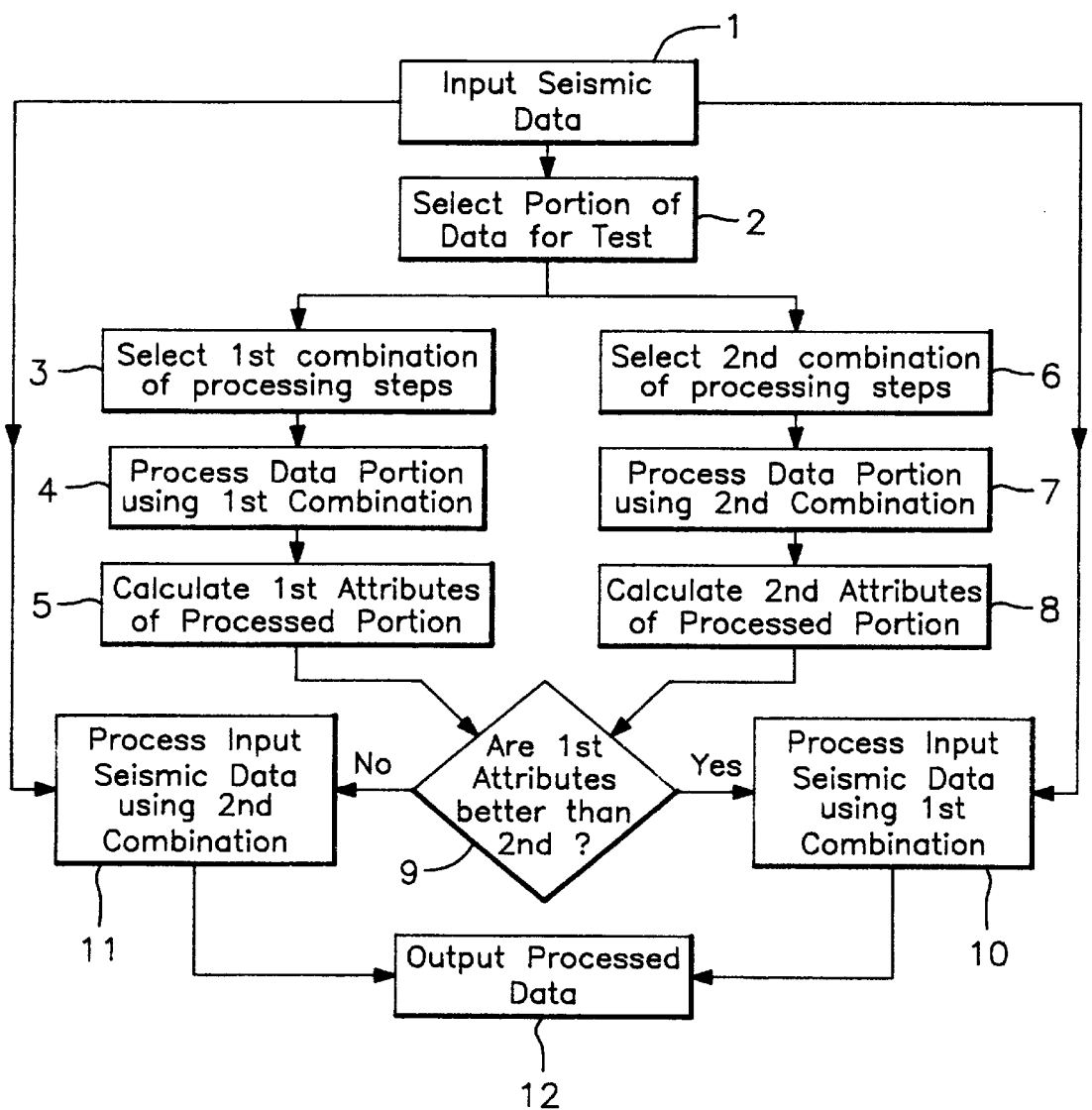
FIG. 1 is a schematic diagram illustrating a method constituting a first embodiment of the invention.

A suitable data processor, such as that which performs the seismic processing, can readily be programmed by someone skilled in the relevant art to provide an apparatus constituting an embodiment of the invention.

Referring now to FIG. 1, seismic data, such as land-based surface seismic data or marine seismic data, are supplied as input at step 1. At step 2, a portion of the input seismic data is selected for testing. In general, because of differences in seismic data acquired at different sites, it is necessary to select a portion from the input seismic data which is to be processed so as to establish appropriate parameters for the full processing of the seismic data. This may be a portion relating to those geological features about which the most information is known from other sources.

At step 3, a first combination of processing steps forming the processing method for the input seismic data is selected. The actual sequence of steps required for the seismic data to be optimally processed depends on the nature of the acquired seismic data. Many seismic processing steps are known, such as designature, gather, velocity analysis, deconvolution, stack, migration, and filtering, all of which have been mentioned hereinbefore. The first combination of processing steps is selected from these and from any other suitable techniques which may be appropriate.

At step 4, the data portion selected in step 2 is processed using the first combination of processing steps selected in step 3. The resultant processed data portion is then analyzed at step 5 so as to calculate the attributes thereof. For instance, these attributes may relate to position, resolution, and noise as mentioned hereinbefore. In particular, by using per se known techniques, the processed data portion is analyzed to establish measures of quality, such as detectability of interfaces, resolving factor, signal to noise ratio, and effective bandwidth. Techniques suitable for such analysis are disclosed in Berkhout A. J., "Seismic Resolution", Handbook of Geophysical Exploration, edited by K. Helbig and S. Treitel, Geophysical Press, 1984.

At step 6, a second combination of processing steps, different from the first combination, is selected for processing of the data portion selected in step 2.

In steps 7 and 8, the data portion is processed and analyzed in the same way as in steps 4 and 5 but using the second combination of processing steps.

At step 9, the attributes of the processed data portion resulting from the first combination of processing steps are compared with the attributes from the second combination of processing steps. Depending on the requirements of the processed seismic data, it may be sufficient to compare one attribute, such as resolving factor or signal-to-noise ratio. In other circumstances, the comparison may involve forming a function of the attributes resulting from each combination of processing steps, such as a linear combination. If the attributes resulting from the first combination of processing steps represent better quality than those resulting from the second combination, the input seismic data are processed using the first combination at step 10. Otherwise, the input seismic data are processed using the second combination of processing steps in step 11. The processed data are then output at step 12. For instance, the output data may be in the form of a processed seismic image, which may be 2 dimensional or 3 dimensional, representing the geology in the region where the seismic data were acquired.

FIG. 1 illustrates a control method in which only two combinations of processing steps are considered, that providing the better quality processing being selected. However, more than two such combinations may be used to process the sample data and the combination providing the best attributes may be selected for processing the input seismic data to provide the output data.

It is thus possible to optimise the processing of seismic data without requiring any subjective intervention. The quality of the processed sample data is assessed using objective techniques so as to select the better or best parameter, which in this case is the specific combination of processing steps used to process the seismic data.

FIG. 2 illustrates a method of controlling seismic processing in which a plurality of consecutive processing steps has been selected for processing the acquired seismic data. The input seismic data are supplied at step 1 and a portion of the data for test is selected at step 2, as in the embodiment illustrated in FIG. 1. At step 23, the first processing step is selected and, at step 24, initial values for the parameters of this processing step are selected. In particular, each processing step has processing parameters which are required to be set prior to processing by that step. The initial selection of parameter values may be arbitrary or may represent "best guesses" for the processing step based on experience.

At step 25, the processing step is applied to the selected data portion and, at step 26, the attributes of the processed data portion are calculated, for instance as described for the steps 5 and 8 in FIG. 1. At step 27, the attributes are tested for acceptability. As described with reference to FIG. 1, a single attribute may be considered or a function of the attributes may be used to assess the processed sample. The test for acceptability may comprise testing against a predetermined reference value or testing against attributes obtained in a previous loop of the method. In the former case, the parameter is fixed when a predetermined reference value of the attributes has been achieved. In the latter case, the method may perform iterations so as to maximise the attributes and hence determine the optimum parameter values corresponding to the maximised attributes. If the attributes are not acceptable, step 28 adjusts the values of the parameters and steps 25 to 27 are performed again. The function of the attributes which are maximised (or used to define the reference value) as well as the way in which the parameter values are varied, i.e. their initial values and the order and amounts by which they are varied to achieve maximisation (or the reference value) more quickly, can if desired be determined in advance by the use of expert systems, neural networks or simulated annealing techniques.

Once the attributes have been found to be acceptable in step 27, the processing step is used to process the input data at step 29 with the acceptable or optimised parameter values. Step 30 then determines whether processing is complete. In particular, if all of the processing steps have been performed, then the processed data are output at step 31. Otherwise, the next processing step is selected at step 32 and a portion of the data processed by the preceding test is selected at step 33. The steps 24 to 30 are then repeated until processing is complete and the processed data are output.

It is thus possible to optimise processing of seismic data in each processing step without subjective intervention. Although the method described hereinbefore does not require any intervention at all, there may be circumstances in which it is appropriate for an operator to intervene at the step 27. For instance, where it is not possible for a purely objective assessment of attributes to be made, an operator may assess the acceptability of attributes so as to make the decision shown at the step 27. However, such intervention is based on objective criteria and the selected attributes of the processed data may form part of the output data.

EXAMPLE

Migration repositions the seismic events into their correct spatial positions and dips. As this process involves moving seismic data spatially and temporally, it is normal practice to remove as much noise and multiples as possible prior to migration. Thus the following processing sequence prior to migration may be effected:

Coherent Noise Attenuation
Parameters that may be chosen include:
Dip limits of the coherent noise to be attenuated.
The slopes of the dip limit cut off
The amount of attenuation to perform
For example, it might be chosen to attenuate dips from +/−6 to 20 ms/trace to 30 dB with cosine slopes.
Deconvolution
Parameters that may be chosen include:
The autocorrelation design
The operator length
The deconvolution gap
Pre-whitening
The number of traces to averages across
The number of deconvolution windows required for differing geological regions
For example, a 120 ms operator with a 24 ms gap designed from 500 to 2500 ms averaged over 11 traces with 1 percent pre-whitening might be applied.
Temporal Filtering
Parameters that may be chosen include:
The upper and lower frequency cut off
The frequency cut off slopes
The temporal change characteristics of these
The phase of the filter zero minimum
For example, it might be chosen to apply a 15 (18) to 90 (48) Hz (dB/Octave) zero phase bandpass filter at 0 ms linear tapering to a 6 (18) to 30 (24) Hz (dB Octave) zero phase bandpass filter at 5000 ms.

Examples of the values of the quantified attributes using the method of the invention are as follows:

| Measurement | Value |
| --- | --- |
| Time Length/s | 0.008 |
| Resolution Factor | 9.241 |
| Resolving Power | 0.351 |
| Temporal Resolution/s | 0.008 |
| Signal to Noise Ratio | 188.173 |
| Detectability | 28209.336 |
| High Frequency Effective Bandwidth/Hz | 59.347 |
| Low Frequency Effective Bandwidth/Hz | 28.178 |
| Peak Frequency/Hz | 39.062 |
| Temporal Resolution/m | 16.426 |
| Unmigrated Fresnel Size/m | 802.409 |
| Migrated Fresnel Size/m | 42.393 |
| Multiple Activity Time Length/s | 0.034 |
| Spatial Frequency Length/K | 0.003 |

It is thus possible to achieve high quality processed seismic data by seismic processing in which appropriate parameters are selected without requiring subjective intervention. Optimal processing of seismic data may be provided. Alternatively, where there is no single optimal processing, the output data can include indications of the attributes of the data so as to imply a guaranteed minimum quality of the processing.

I claim:

1. A method of controlling the quality of processed seismic data, comprising the steps of:

(a) selecting a first portion of the seismic data for test processing;

(b) processing said selected first portion of the seismic data according to a combination of at least one first processing step to form a first processed data portion;

(c) analyzing said first processed data portion to form a measure of the quality of the first processed data portion;

(d) controlling a parameter of the processing in the response to the quality measure;

(e) processing the seismic data utilizing the parameter which has been controlled in step (d);

(f) selecting a second processing step;

(g) selecting a second portion of the processed seismic data produced by step (e) for test processing;

(h) processing said second portion of the seismic data selected in step (g) according to the second processing step to form a second processed data portion;

(i) analyzing said second processed data portion using the quality measure of step (c);

(j) controlling a parameter in said second processing step in response to the quality measure from step (i); and (k) processing the seismic data utilizing the parameter which has been controlled in step (j).

2. The method as claimed in claim 1, wherein step (b) comprises processing said first portion using a combination of two or more first processing steps, and in which the parameter in step (d) comprises a combination of processing steps.

3. The method as claimed in claim 2, comprising performing the steps (b) and (c) for a plurality of different combinations of first processing steps, the step (d) comprising selecting the combination for processing steps having the higher or highest measure.

4. The method as claimed in claim 1, comprising repeating the steps (b) and (c) for different values of the parameter in step (d), the step (d) comprising selecting the value of the parameter corresponding to the higher or highest quality measure.

5. The method as claimed in claim 1, comprising repeating the steps (b) and (c) for different values of the parameter in step (d) until the quality measure exceeds a predetermined value, the step (d) comprising selecting the first value of the parameter that causes the quality measure to exceed the predetermined value.

6. The method as claimed in claim 1, in which the parameter in step (d) comprises a plurality of parameters.

7. The method as claimed in claim 1, in which the quality measure formed in step (c) is a function of a plurality of attributes of the first processed data portion.

8. The method as claimed in claim 1, wherein processing step (b) comprises splitting the seismic data portion into components which are used to quantify the data in terms of Position, Resolution and Noise content.

9. An apparatus for controlling processing of seismic data, comprising:

first selecting means for selecting a portion of the seismic data for test processing;

first processing means for processing the selected portion of the seismic data according to a first processing step to form a first processed data portion;

first analyzing means for analyzing the first processed data portion to form a measure of the quality of the first processed data portion;

first controlling means for controlling a parameter of the processing in response to the quality measure;

first means for processing the seismic data utilizing the parameter which has been controlled by the first controlling means;

means for selecting a second processing step;

second selecting means for selecting a portion of the processed seismic data produced by said first means for processing the seismic data;

second processing means for processing, according to the second processing step, said selected portion of the processed seismic data to form a second processed data portion;

second analyzing means for analyzing said second processed data portion, using the quality measure of said first means for analyzing the first processed data portion;

second controlling means for controlling a parameter of said second processing step in response to the quality measure produced by said second means for analyzing said second processed data portion; and second means for processing the seismic data utilizing the parameter which has been controlled by said second means for controlling a parameter of said second processing step.

* * * * *